United States Patent
Giuliani et al.

(10) Patent No.: US 12,527,260 B2
(45) Date of Patent: Jan. 20, 2026

(54) AGRICULTURAL VEHICLE WITH TINE SUPPORT GUIDES THAT LIMIT DEFLECTION OF A TINE

(71) Applicant: CNH Industrial America LLC, New Holland, PA (US)

(72) Inventors: Enrico Giuliani, Russi-RA (IT); Albert Childs, Meadville, PA (US)

(73) Assignee: CNH Industrial America LLC, New Holland, PA (US)

( * ) Notice: Subject to any disclaimer, the term of this patent is extended or adjusted under 35 U.S.C. 154(b) by 751 days.

(21) Appl. No.: 17/875,996

(22) Filed: Jul. 28, 2022

(65) Prior Publication Data

US 2024/0032476 A1 Feb. 1, 2024

(51) Int. Cl.
*A01F 15/10* (2006.01)
*A01D 89/00* (2006.01)

(52) U.S. Cl.
CPC .......... *A01F 15/106* (2013.01); *A01D 89/002* (2013.01)

(58) Field of Classification Search
CPC .. A01F 15/106; A01F 15/10; A01F 2015/107; A01D 89/002; A01D 57/02
USPC ............... 56/364, 400, 220, 341, 344, 367; 460/122; 248/226.11
See application file for complete search history.

(56) References Cited

U.S. PATENT DOCUMENTS

| | | | |
|---|---|---|---|
| 2,193,138 A | 3/1940 | Meyer | |
| 2,987,867 A * | 6/1961 | Nicholson | A01D 80/02 56/400 |
| 3,014,335 A * | 12/1961 | Nolt | A01D 80/02 56/400 |
| 3,065,591 A * | 11/1962 | Gustafson | A01D 80/02 56/400 |
| 3,206,920 A * | 9/1965 | Hofer | A01D 89/003 172/705 |
| 4,454,707 A * | 6/1984 | Ronayne | A01F 15/106 100/88 |
| 4,745,736 A * | 5/1988 | Copley | A01D 80/02 56/364 |
| 5,042,243 A * | 8/1991 | Doering | A01D 80/02 460/122 |
| 8,096,102 B2 * | 1/2012 | Smith | A01D 89/002 56/364 |
| 9,386,749 B1 * | 7/2016 | Dow | A01D 84/00 |

(Continued)

FOREIGN PATENT DOCUMENTS

| | | | | |
|---|---|---|---|---|
| DE | 2444609 A | * | 4/1976 | ............ A01D 87/02 |
| DE | 19620251 B4 | * | 6/2012 | ............ A01D 80/02 |

(Continued)

*Primary Examiner* — Alicia Torres
*Assistant Examiner* — Sunny D Webb
(74) *Attorney, Agent, or Firm* — Buchanan Ingersoll & Rooney PC (57) ABSTRACT

A pickup assembly for an agricultural vehicle includes: a rotatable reel; a plurality of tine bars coupled to the reel such that rotation of the reel moves the tine bars through a movement path; at least one tine carried by each of the tine bars; and at least one tine support guide carried by at least one of the tine bars. The at least one tine support guide includes at least one slot that allows deflection of the deflectable section of a tine in a first direction and limits deflection of the deflectable section in a second direction that is opposite the first direction.

20 Claims, 4 Drawing Sheets (56) References Cited

U.S. PATENT DOCUMENTS 10,306,836 B2 * 6/2019 Dunham ................ A01D 80/02
11,793,114 B2 * 10/2023 Childs .................... A01F 15/10

FOREIGN PATENT DOCUMENTS

GB          1010442      11/1965
RU      2 658 387 C1     2/2017

* cited by examiner

AGRICULTURAL VEHICLE WITH TINE SUPPORT GUIDES THAT LIMIT DEFLECTION OF A TINE

BACKGROUND OF THE INVENTION

The present invention pertains to agricultural vehicles and, more specifically, to agricultural balers.

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

A baler may generally include a chassis, supported by wheels, a pickup to engage and lift the crop material into the baler, a cutting unit, a main baling chamber for forming a bale, and a wrapping mechanism for wrapping or tying a material around the bale after it has been formed in the main baling chamber.

The pickup may include a plurality of tines that are moved to pick up crop material. While picking up crop material, the tines are susceptible to deflection. While not all deflection is necessarily harmful, there are instances where excessive deflection can damage the tines.

What is needed in the art is a way to reduce the risk of tines being damaged while picking up crop material.

SUMMARY OF THE INVENTION

Exemplary embodiments provided according to the present disclosure include one or more tine support guides with a slot that allows deflection of a deflectable section of a tine in one direction while limiting deflection of the tine in the opposite direction.

In some exemplary embodiments provided in accordance with the present disclosure, a pickup assembly for an agricultural vehicle includes: a rotatable reel; a plurality of tine bars coupled to the reel such that rotation of the reel moves the tine bars through a movement path; at least one tine carried by each of the tine bars; and at least one tine support guide carried by at least one of the tine bars, the at least one tine support guide comprising at least one open slot aligned with a deflectable section of the at least one tine of the respective tine bar that allows deflection of the deflectable section in a first direction and limits deflection of the deflectable section in a second direction that is opposite the first direction.

In some exemplary embodiments provided in accordance with the present disclosure, an agricultural baler includes: a chassis; a baling chamber carried by the chassis and configured to form a bale from picked up crop material; and a pickup assembly carried by the chassis and configured to pick up crop material that is fed to the baling chamber. The pickup assembly includes: a rotatable reel; a plurality of tine bars coupled to the reel such that rotation of the reel moves the tine bars through a movement path; at least one tine carried by each of the tine bars; and at least one tine support guide carried by at least one of the tine bars, the at least one tine support guide comprising at least one open slot aligned with a deflectable section of the at least one tine of the respective tine bar that allows deflection of the deflectable section in a first direction and limits deflection of the deflectable section in a second direction that is opposite the first direction.

In some exemplary embodiments provided in accordance with the present disclosure, a pickup assembly for an agricultural vehicle includes: a rotatable reel; a plurality of tine bars coupled to the reel such that rotation of the reel moves the tine bars through a movement path; at least one tine carried by each of the tine bars; and at least one tine support guide coupling at least one tine to a respective one of the tine bars. The at least one tine support guide includes at least one closed slot in which a deflectable section of the coupled at least one tine is disposed that allows deflection of deflectable section in a first direction and limits deflection of the deflectable section in a second direction that is opposite the first direction.

In some exemplary embodiments provided in accordance with the present disclosure, an agricultural baler includes: a chassis; a baling chamber carried by the chassis and configured to form a bale from picked up crop material; and a pickup assembly carried by the chassis and configured to pick up crop material that is fed to the baling chamber. The pickup assembly includes: a rotatable reel; a plurality of tine bars coupled to the reel such that rotation of the reel moves the tine bars through a movement path; at least one tine carried by each of the tine bars; and at least one tine support guide coupling at least one tine to a respective one of the tine bars. The at least one tine support guide includes at least one closed slot in which a deflectable section of the coupled at least one tine is disposed that allows deflection of deflectable section in a first direction and limits deflection of the deflectable section in a second direction that is opposite the first direction.

One possible advantage that may be realized by exemplary embodiments provided according to the present disclosure is that the tine support guide(s) can allow deflection of the tine(s) in one direction, e.g., opposite to a normal rotation direction, while limiting deflection in the opposite direction, e.g., while the reel and tines rotation in an opposite direction.

Another possible advantage that may be realized by exemplary embodiments provided according to the present disclosure is that the tine support guide(s) can be conveniently retrofit into existing pickup assemblies.

Yet another possible advantage that may be realized by exemplary embodiments provided according to the present disclosure is that the tine support guide(s) can also couple the tine(s) to the tine bar, providing an integrated solution for controlling deflection.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural baler and/or components thereof are usually determined with reference to the direction of forward operative travel of the towing vehicle, but they should not be construed as limiting. The terms "longitudinal" and "transverse" are determined with reference to the fore-and-aft direction of the towing vehicle and are equally not to be construed as limiting.

Figure 1:
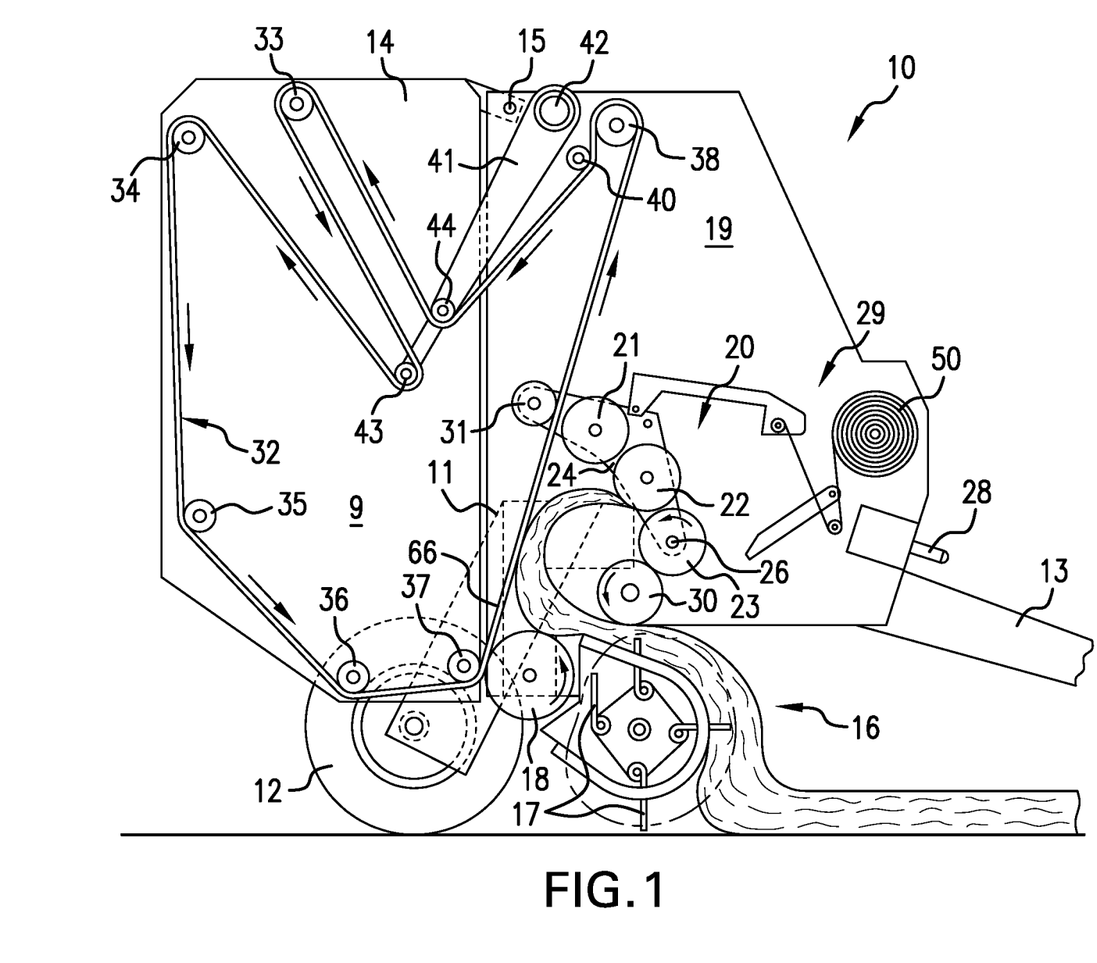
FIG. 1 illustrates a side sectional view of an exemplary embodiment of an agricultural baler including a pickup assembly, provided in accordance with the present disclosure.

Referring now to the drawings, and more particularly to FIG. 1, an exemplary embodiment of a rotary or round baler 10 is illustrated having an expandable chamber defined in part by belts and rolls, as disclosed in U.S. Pat. No. 4,870,812, which is incorporated herein by reference. Baler 10 has a chassis 11, carrying a pair of side walls 19 (only one side wall is shown), supported by a pair of wheels 12 (only one wheel 12 shown). As used herein, a rotary or round baler 10 is a baler that produces a substantially cylindrical bale having a substantially round or circular cross section. A forwardly mounted tongue 13 is provided on chassis 11 for connection to a tractor. Pivotally connected to a side wall 19 by a pair of stub shafts 15 is a tailgate 14 which is closed during bale formation. A pickup assembly 16, carried by chassis 11, includes tines 17 movable in a predetermined movement path to lift crop material from the ground and deliver it to a floor roll 18, rotatably mounted on chassis 11.

An expandable baling chamber 9 for forming bales is defined partly by a sledge assembly 20 including transversely extending bale-forming rolls 21, 22, 23 journalled at their ends in a pair of spaced arms 24, one of which is shown. These arms 24 are pivotally mounted on stub shafts 26 for providing movement of sledge assembly 20. Rolls 21, 22, 23 are driven in a rotation direction by, for example, chains and sprockets coupled to a drive shaft 28. The drive shaft 28 may be, for example, a power take-off. A starter roll 30, mounted on chassis 11, is also driven counter-clockwise. A freely rotatable idler roll 31, carried by arms 24, moves in an arcuate path with sledge assembly 20.

A wrapping mechanism 29 is mounted between side walls 19 on chassis 11 and sledge assembly 20 forwardly of the baling chamber 9. Wrapping material, such as a polymer sheet, net, twine, etc., is dispensed from a supply 50 of wrapping material, which may be a roll of wrapping material, to the chamber 9 via an opening between rolls 22 and 23.

The baling chamber 9 is further defined by an apron 32 comprising a plurality of continuous side-by-side belts supported by guide rolls 33, 34, 35, 36, 37 rotatably mounted in tailgate 14. Apron 32 is also supported by drive roll 38, mounted on chassis 11. Although apron 32 passes between roll 21 and idler roll 31, it is in engagement only with idler roll 31 and not roll 21. A suitable coupler connected to drive shaft 28 provides rotation of drive roll 38, causing movement of apron 32 in the directions indicated by the arrows in FIG. 1. An additional guide roll 40 ensures proper engagement between apron 32 and drive roll 38. A pair of take-up arms 41 (only one shown) is pivotally mounted on chassis 11 by a cross shaft 42 for movement between inner, intermediate and outer positions. Take-up arms 41, which carry additional guide rolls 43, 44 for supporting apron 32, are resiliently urged toward their inner positions.

When the elements of round baler 10 are disposed as shown in FIG. 1, an inner course 66 of apron 32 extends between guide roll 37 and idler roll 31 to form the rear wall of the core starting chamber 9, while the inwardly facing surfaces of rolls 21, 22, 23 define, in a general manner, a rearwardly inclined front wall. Floor roll 18 defines the bottom of the chamber 9, and with starter roll 30, provides an inlet for crop material.

When round baler 10 travels across a field, tines 17 pickup crop material from the ground and convey it through the inlet. The crop material is conveyed by floor roll 18 into engagement with apron inner course 66 which urges the crop material upward and forward into engagement with the rolls on sledge assembly 20. In this manner, crop material is coiled in a clockwise direction to start a bale core. Continued feeding of crop material into the baling chamber 9 by tines 17 causes apron inner course 66 to expand in length around a portion of the circumference of the bale core as the diameter increases. Take-up arms 41 rotate from their inner position toward their outer position to accommodate expansion of the inner course 66 of the apron in a well-known manner. After a bale has been formed and wrapped, tailgate 14 is opened and the bale is ejected rearwardly.

During bale formation, sledge assembly 20 moves between a bale-starting position to a full bale position. This movement causes idler roll 31 to move in an arcuate path while maintaining apron 32 in close proximity to roll 21, thereby allowing roll 21 to strip crop material from the belts and prevent or reduce significantly the loss of crop material between roll 21 and apron 32 during bale formation. Sledge assembly 20 is pushed outward towards its full bale position during bale formation as the crop material expands against rolls 21, 22, 23 and then subsequently is pulled inward by apron 32.

Figure 2:
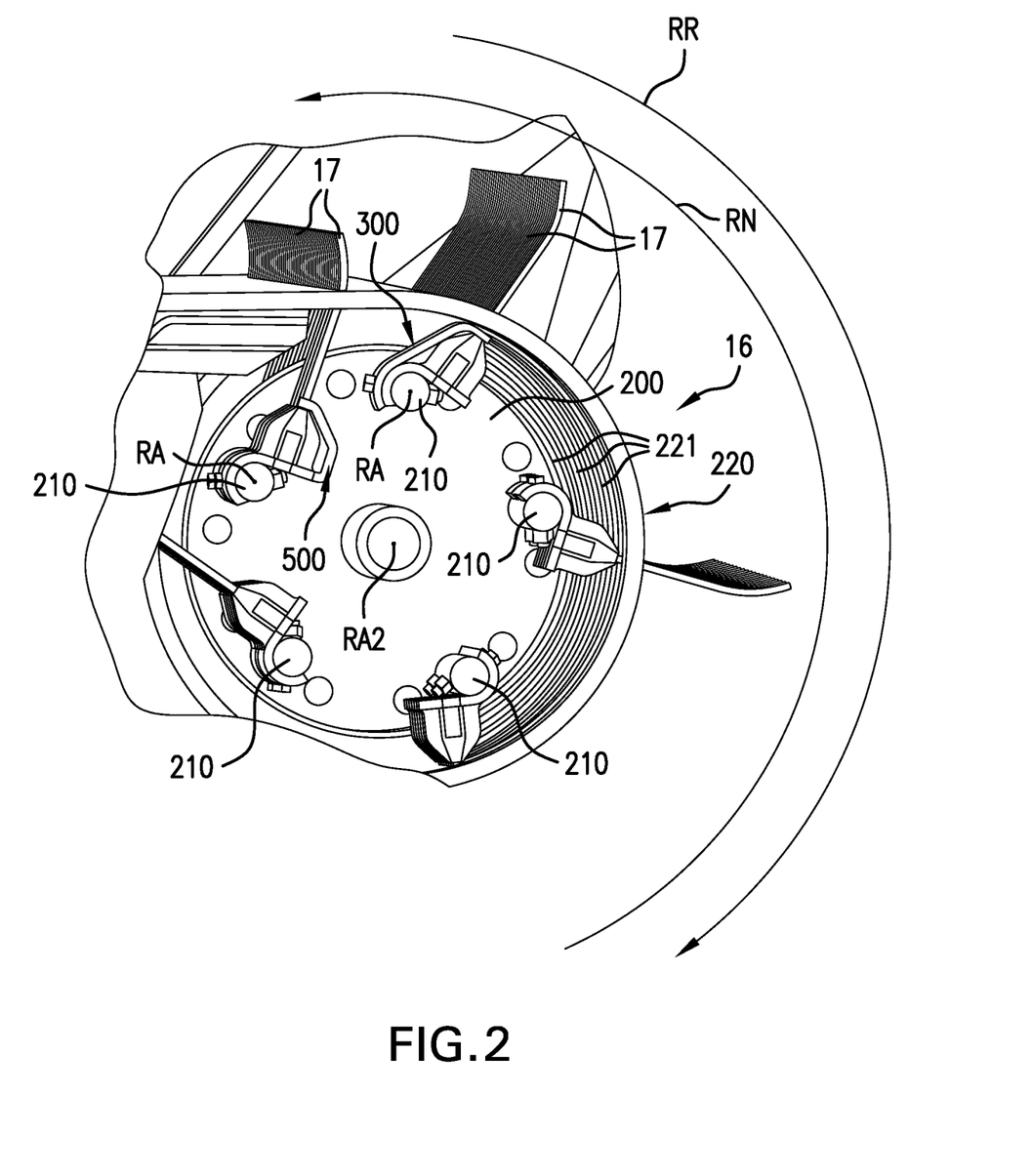
FIG. 2 illustrates a side view of the pickup assembly of FIG. 1.

Referring now to FIG. 2, the pickup assembly 16 is illustrated in greater detail. The pickup assembly 16 includes a rotatable reel 200 and a plurality of tine bars 210 that are each coupled to the reel 200 such that rotation of the reel 200 moves the tine bars 210 through a movement path, e.g., through a circular or arced path. The tine bars 210 may, for example, be carried by the reel 200 so the tine bars 210 move through a circular movement path as the reel 200 rotates. The reel 200 may be configured to rotate, for example, in a normal rotation direction RN for picking up crop material and an opposite reverse rotation direction RR to, for example, clear plugs of crop material.

At least one of the tines 17 is carried by each of the tine bars 210 so the movement path of each of the tines 17 generally follows the movement path of its respective tine bar 210. In some embodiments, each of the tine bars 210 is rotatable about a bar axis of rotation RA independently of the other tine bars 210, allowing each of the tine bars 210 to rotate about its respective axis of rotation RA at various positions in the movement path. In other words, the axis of rotation RA for each tine bar 210 is not a reel axis of rotation RA2 of the reel 200, about which all of the tine bars 210 may rotate, but rather extends, for example, parallel to a length of each tine bar 210. When each of the tine bars 210 is rotatable about its respective axis of rotation RA, the tine bars 210 can each independently rotate to change the angular orientation of the tines 17, as can be appreciated from the various angular orientations of the tines 17 in FIG. 2. The tine bars 210 may be configured to rotate about their respective axes of rotation RA at various points in their respective movement paths to, for example, extend and retract the carried tines 17 through guide openings 221 of a pickup band assembly 220 that partially surrounds the reel 200.

At least one tine support guide, illustrated as a tine support guide 300 and a tine support guide 500, is carried by at least one of the tine bars 210. As illustrated, each of the tine support guides 300, 500 may be carried by a respective one of the tine bars 210. It should be appreciated that while two different tine support guides 300, 500 are illustrated in FIG. 2, in some embodiments the pickup assembly 16 only includes one type of the tine support guides 300, 500, with each tine bar 210 carrying a respective one or more tine support guides 300, 500. It should be appreciated that while only one tine support guide 300 is illustrated as being carried by the respective tine bar 210, in some embodiments multiple tine support guides 300 are carried by a single tine bar 210.

Figure 3:
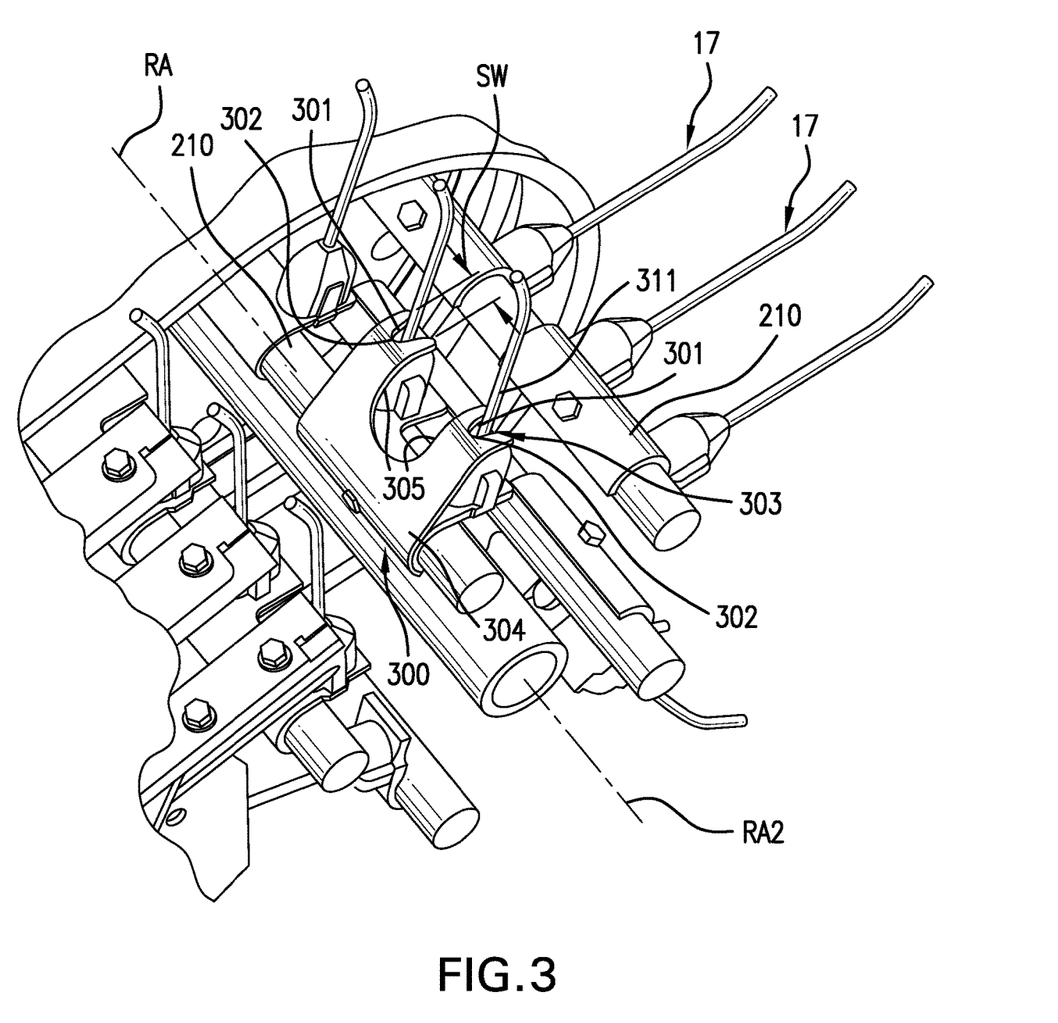
FIG. 3 illustrates a perspective view of the pickup assembly of FIGS. 1-2 with an exemplary embodiment of a tine support guide including one or more open slots, provided in accordance with the present disclosure.
Figure 4:
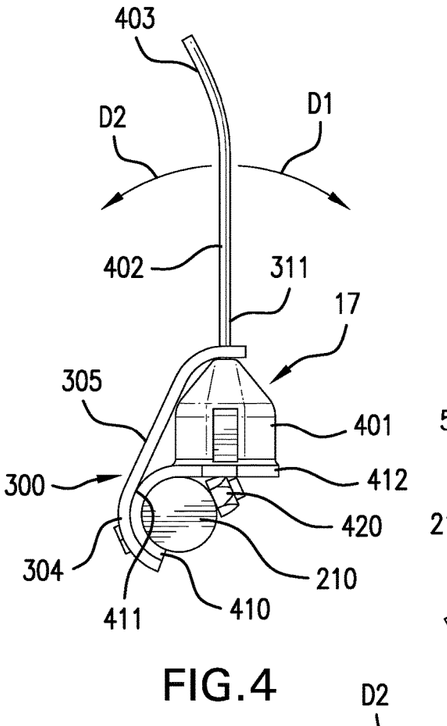
FIG. 4 illustrates a side view of the tine support guide and an associated tine of FIG. 3.

Referring specifically now to FIGS. 3-4, the tine support guide 300 is illustrated in greater detail. The tine support guide 300 includes one or more open slots 301 that are each aligned with a deflectable section 311 of a respective tine 17 carried by the respective tine bar 210. As illustrated, the tine support guide 300 includes two open slots 301 that are each aligned with a respective deflectable section 311 of a tine 17, but it should be appreciated that, in some embodiments, the tine support guide 300 may include a single open slot 301 aligned with a respective deflectable section 311 of a tine 17 or, alternatively, may include more than two open slots 301 each aligned with a respective deflectable section 311 of a tine 17. Each open slot 301 allows deflection of the deflectable section 311 in a first direction D1 and limits deflection of the deflectable section 311 in a second direction D2 that is opposite the first direction D1. Deflection of the deflectable section 311 in the first direction D1 may occur, for example, when the reel 200 rotates in the normal rotation direction RN so the tines 17 pick up crop material, with the picked up crop material exerting a force on the tines 17 that causes the deflection in the first direction D1. In contrast, deflection of the deflectable section 311 in the second direction D2 may occur, for example, when the reel 200 rotates in the reverse rotation direction RR. In this respect, the open slot(s) 301 of the tine support guide 300 allow deflection of the tines 17 in the first direction D1 while the tines 17 pick up crop material, which is desired, while limiting deflection of the tines 17 in the second direction D2 while the reel 200 and the tines 17 are rotating in the reverse rotation direction RR and significant deflection is undesirable.

In some embodiments, the open slot 301 is tapered in the first direction D1 and the second direction D2 so a slot width SW of the open slot 301 changes with respect to the deflection directions D1, D2 of the deflectable section 311 of the tines 17. The slot width SW may, for example, define a minimum slot width at a closed end 302 of the slot 301 that increases towards an opening 303 of the slot 301. In some embodiments, the minimum slot width SW of the slot 301 at the closed end 302 may be generally the same as a width of the aligned deflectable section 311. By tapering the open slot(s) 301 to the minimum slot width SW at the closed end 302, the tines 17 may be directed towards a natural centered position when deflecting in the second direction D2 so the tines 17 are less susceptible from "crossing over", i.e., moving into the movement path of an adjacent tine 17, which can limit the risk of the tines 17 being damaged during reverse rotation. On the other hand, the slot width SW increasing towards the opening 303 can allow slight lateral deflection of the deflectable section 311, which is normal while picking up crop material, while also preventing excessive lateral deflection that could lead to the tine 17 crossing over.

In some embodiments, the tines 17 each include a tine base 401 (best illustrated in FIG. 4) that is coupled to its respective tine bar 210 and the deflectable section 311 coupled to the tine base 401. The tine base 401 and/or the deflectable section 311 may, for example, each comprise a polymer and/or rubber material that is flexible. The deflectable section 311 may include an upstanding section 402 that is coupled to the tine base 401 and is aligned with the open slot 301 and a curved section 403 that is coupled to the upstanding section 402. It should be appreciated that the section 402 is "upstanding" in the respect that the section 402 extends away from the tine base 401 and the tine bar 210, and does not necessarily mean that the upstanding section 402 is a straight section, although in some embodiments the upstanding section 402 can be a straight section. The curved section 403 may curve in a variety of ways. As illustrated, for example, the curved section 403 may extend, i.e., curve, in a direction towards the closed end 302 of the open slot 301. By curving the curved section 403 in this manner, the curved section 403 can be shaped to scoop and pick up crop material during rotation of the tine 17 in the normal rotation direction RN.

In some embodiments, the tine support guide 300 includes a support base 304 that is coupled to the respective tine bar 210 and one or more extensions 305 that are coupled to the support base 304 and include the open slot(s) 301. As best illustrated in FIG. 4, the support base 304 is coupled to the tine bar 210 via the use of a support bracket 410. The support base 304 may be fastened to the support bracket 410 with a bolt 420 or other type of fastener that can conveniently and easily couple the support base 304, and thus the tine support guide 300, to the tine bar 210. The bolt 420 may similarly be loosened and removed in order to remove the tine support guide 300. In some embodiments, such as when the support bracket 410 includes a curved section 411 that wraps around the tine bar 210 and a flat section 412 to which the tine base 401 is coupled, the support base 304 may wrap around a portion of the curved section 411. The extension(s) 305, on the other hand, may extend away from the support base 304 and the tine bar 210 so the open slot(s) 301 formed in the extension(s) 305 align with the respective deflectable section 311 of the tine(s) 17 and limit deflection of the deflectable section 311 in the second direction D2 to the desired amount.

Figure 5:
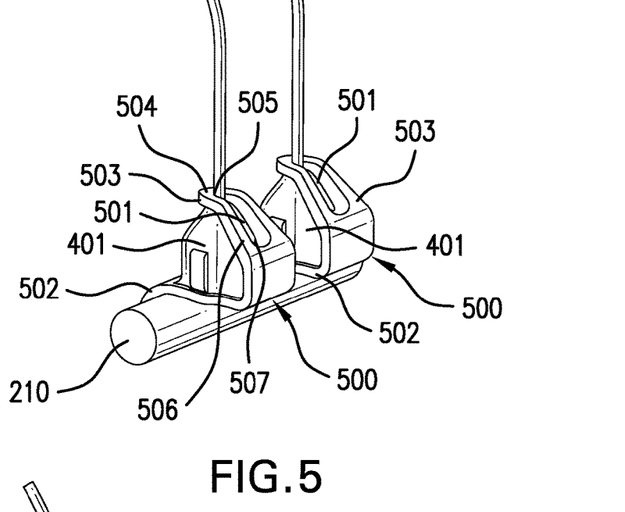
FIG. 5 illustrates a perspective view of another exemplary embodiment of a tine support guide including one or more closed slots, provided in accordance with the present disclosure.
Figure 6:
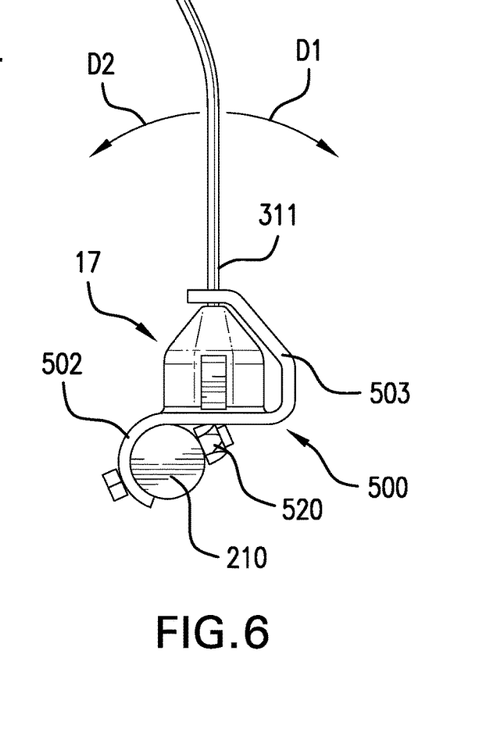
FIG. 6 illustrates a side view of the tine support guide and an associated tine of FIG. 5.

Referring now to FIGS. 5-6, the tine support guide 500 is illustrated in greater detail. Unlike the previously described tine support guide 300, which has an open slot 301, the tine support guide 500 includes one or more closed slots 501 in which the deflectable section 311 of a respective tine 17 is disposed. The closed slot(s) 501 allows deflection of the deflectable section 311 in the first direction D1 while limiting deflection in the second direction D2. Also unlike the tine support guide 300, which may be mounted to the support bracket 410, the tine support guide 500 couples the tine(s) 17 to the respective tine bar 210. In this respect, the tine support guide 500 acts as both a mounting bracket and support for the tine(s) 17. As illustrated in FIG. 5, two tine support guides 500 may be provided, with each tine support guide 500 having a respective closed slot 501 and coupling a single tine 17 to the tine bar 17, but in some embodiments a single tine support guide 500 may have one or more closed slots 501 with multiple tines 17 disposed therein and couple multiple tines 17 to a respective tine bar 210.

In some embodiments, the tine support guide 500 includes a coupling section 502 that couples the tine 17 to the tine bar 210 and a slot section 503 that is coupled to and extends away from the coupling section 502 and includes the closed slot(s) 501. The coupling section 502 may be coupled, for example, to the tine base 401 to couple the tine 17 to the tine bar 210. A fastener, such as a bolt 520, may be used to couple the coupling section 502 to the tine bar 210. In some embodiments, the tine base 401 comprises a polymer and/or a rubber that is molded to the coupling section 502. In some embodiments, the tine support guide 500 partially wraps around the tine bar 210, e.g., the coupling section 502 wraps around a part of the tine bar 210. The slot section 503 may include a first section 504 that includes a first closed end 505 of the slot 501 and a second section 506 that includes a second closed end 507 of the slot 501. In some embodiments, the first section 504 extends generally parallel with a surface of the tine base 401 that is coupled to the coupling section 502. The first closed end 505 may be adjacent to, if not contacting, the deflectable section 311 of the tine 17 when the deflectable section 311 is in an unflexed state so the first closed end 505 prevents the tine 17 from appreciably deflecting in the second direction D2. In contrast, the second section 506 may extend at an angle relative to the first section 504 so the deflectable section 311 is allowed to deflect in the first direction D1 towards the second closed end 507 in a defined deflection path. It should be appreciated that the first section 504 and the second section 506, as well as the closed slot 501, can be shaped and sized in a variety of ways to control deflection of the tine(s) 17.

From the foregoing, it should be appreciated that the tine support guides 300, 500 provided according to the present disclosure allow the tines 17 to deflect as normal when rotating in the normal rotation direction RN while limiting, if not eliminating, deflection when the tines 17 rotate in the reverse rotation direction RR. The tine support guides 300, 500 can also reduce the risk of the tines 17 crossing over. In some embodiments, the tine support guide 300 can be readily retrofit to a tine bar 210 that already has one or more tines 17 mounted thereon. Further, in some embodiments, the tine support guide 500 can also mount one or more tines 17 to the respective tine bar 210. Therefore, the tine support guides 300, 500 provided according to the present disclosure can reduce the risk of the tines 17 breaking and/or crossing over due to deflection in the second direction D2 while still allowing the tines 17 to deflect normally in the first direction D1.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A pickup assembly for an agricultural vehicle, comprising:
    a rotatable reel;
    a plurality of tine bars coupled to the reel such that rotation of the reel moves the tine bars through a movement path;
    at least one tine carried by each of the tine bars; and
    at least one tine support guide carried by at least one of the tine bars, the at least one tine support guide comprising at least one open slot aligned with a deflectable section of the at least one tine of the respective tine bar that allows deflection of the deflectable section in a first direction of rotation of the reel and limits deflection of the deflectable section in a second direction of rotation of the reel that is opposite the first direction,
    wherein the at least one tine support guide includes (i) a first fixed end that is wrapped about the respective tine bar and is fixed to the respective tine bar, and (ii) a second free end, which is arranged opposite the first fixed end, and includes the at least one open slot.

2. The pickup assembly of claim 1, wherein the at least one open slot is tapered in the first direction and the second direction.

3. The pickup assembly of claim 1, wherein the at least one tine comprises a tine base coupled to its respective tine bar and the deflectable section coupled to the tine base, the deflectable section comprising an upstanding section coupled to the tine base and aligned with the at least one open slot and a curved section coupled to the upstanding section, the curved section extending in a direction towards a closed end of the at least one open slot.

4. The pickup assembly of claim 1, wherein the at least one tine support guide comprises a plurality of open slots that are each aligned with a respective deflectable section of one of the tines.

5. The pickup assembly of claim 1, wherein the at least one tine support guide comprises a support base coupled to the respective tine bar and at least one extension coupled to the support base and comprising the at least one open slot.

6. An agricultural baler, comprising:
    a chassis;
    a baling chamber carried by the chassis and configured to form a bale from picked up crop material; and
    a pickup assembly carried by the chassis and configured to pick up crop material that is fed to the baling chamber, the pickup assembly comprising:
    a rotatable reel;
    a plurality of tine bars coupled to the reel such that rotation of the reel moves the tine bars through a movement path;
    at least one tine carried by each of the tine bars; and
    at least one tine support guide carried by at least one of the tine bars, the at least one tine support guide comprising at least one open slot aligned with a deflectable section of the at least one tine of the respective tine bar that allows deflection of the deflectable section in a first direction of rotation of the reel and limits deflection of the deflectable section in a second direction of rotation of the reel that is opposite the first direction,
    wherein the at least one tine support guide includes (i) a first fixed end that is wrapped about the respective tine bar and is fixed to the respective tine bar, and (ii) a second free end, which is arranged opposite the first fixed end, and includes the at least one open slot.

7. The agricultural baler of claim 6, wherein the at least one open slot is tapered in the first direction and the second direction.

8. The agricultural baler of claim 6, wherein the at least one tine comprises a tine base coupled to its respective tine bar and the deflectable section coupled to the tine base, the deflectable section comprising an upstanding section coupled to the tine base and aligned with the at least one open slot and a curved section coupled to the upstanding section, the curved section extending in a direction towards a closed end of the at least one open slot.

9. The agricultural baler of claim 6, wherein the at least one tine support guide comprises a plurality of open slots that are each aligned with a respective deflectable section of one of the tines.

10. The agricultural baler of claim 6, wherein the at least one tine support guide comprises a support base coupled to the respective tine bar and at least one extension coupled to the support base and comprising the at least one open slot.

11. A pickup assembly for an agricultural vehicle, comprising:
a rotatable reel;
a plurality of tine bars that are either fixed to the reel or pivotably coupled to the reel such that rotation of the reel moves the tine bars through a movement path;
at least one tine carried by each of the tine bars; and
at least one tine support guide coupling the at least one tine to a respective one of the tine bars, the at least one tine support guide comprising at least one closed slot in which a deflectable section of the coupled at least one tine is disposed that allows deflection of deflectable section in a first direction of rotation of the reel and limits deflection of the deflectable section in a second direction of rotation of the reel that is opposite the first direction,
wherein in an undeflected state of the at least one tine support guide, the at least one tine support guide is positioned closer to one end of the at least one closed slot than an opposing end of the at least one closed slot.

12. The pickup assembly of claim 11, wherein the at least one tine comprises a tine base coupled to the deflectable section, the at least one tine support guide comprising a coupling section coupled to the tine base and the respective tine bar and a slot section coupled to and extending away from the coupling section and comprising the at least one closed slot.

13. The pickup assembly of claim 12, wherein the deflectable section comprises an upstanding section coupled to the tine base and a curved section coupled to the upstanding section, the upstanding section extending perpendicular with respect to a surface of the coupling section.

14. The pickup assembly of claim 12, wherein the tine base comprises at least one of a polymer or rubber that is molded to the coupling section.

15. The pickup assembly of claim 11, wherein the at least one tine support guide includes (i) a first fixed end that is wrapped about the respective tine bar and is fixed to the respective tine bar, and (ii) a second free end, which is arranged opposite the first fixed end, and includes the at least one open slot.

16. An agricultural baler, comprising:
a chassis;
a baling chamber carried by the chassis and configured to form a bale from picked up crop material; and
a pickup assembly carried by the chassis and configured to pick up crop material that is fed to the baling chamber, the pickup assembly comprising:
a rotatable reel;
a plurality of tine bars that are either fixed to the reel or pivotably coupled to the reel such that rotation of the reel moves the tine bars through a movement path;
at least one tine carried by each of the tine bars; and
at least one tine support guide coupling the at least one tine to a respective one of the tine bars, the at least one tine support guide comprising at least one closed slot in which a deflectable section of the coupled at least one tine is disposed that allows deflection of deflectable section in a first direction of rotation of the reel and limits deflection of the deflectable section in a second direction of rotation of the reel that is opposite the first direction,
wherein in an undeflected state of the at least one tine support guide, the at least one tine support guide is positioned closer to one end of the at least one closed slot than an opposing end of the at least one closed slot.

17. The agricultural baler of claim 16, wherein the at least one tine comprises a tine base coupled to the deflectable section, the at least one tine support guide comprising a coupling section coupled to the tine base and the respective tine bar and a slot section coupled to and extending away from the coupling section and comprising the at least one closed slot.

18. The agricultural baler of claim 17, wherein the deflectable section comprises an upstanding section coupled to the tine base and a curved section coupled to the upstanding section, the upstanding section extending perpendicular with respect to a surface of the coupling section.

19. The agricultural baler of claim 17, wherein the tine base comprises at least one of a polymer or rubber that is molded to the coupling section.

20. The agricultural baler of claim 16, wherein the at least one tine support guide includes (i) a first fixed end that is wrapped about the respective tine bar and is fixed to the respective tine bar, and (ii) a second free end, which is arranged opposite the first fixed end, and includes the at least one closed slot.

* * * * *